Figure 1A:
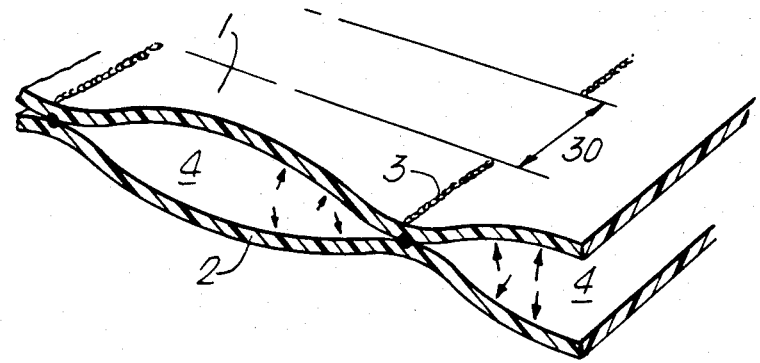

United States Patent [19]

Mansbridge et al.

[11] Patent Number: 4,607,783

[45] Date of Patent: Aug. 26, 1986

[54] STIFFENED PANEL WITH APERTURES

[75] Inventors: Martin H. Mansbridge; John Norton, both of Bristol, England

[73] Assignee: British Aerospace PLC, London, England

[21] Appl. No.: 550,139

[22] Filed: Nov. 9, 1983

[30] Foreign Application Priority Data

Nov. 9, 1982 [GB] United Kingdom ............... 8231914

[51] Int. Cl.⁴ ............................................. B23K 31/02
[52] U.S. Cl. ................................... 228/265; 156/197;
428/593; 428/594
[58] Field of Search ................... 228/157; 156/197;
428/593, 594

[56] References Cited

U.S. PATENT DOCUMENTS 3,639,106  2/1972  Yate ..................................... 428/593
4,217,397  8/1980  Hayase et al. .................. 228/157 X Primary Examiner—Kenneth J. Ramsey
Attorney, Agent, or Firm—Cushman, Darby & Cushman

[57] ABSTRACT

A method of making a stiffened panel including subjecting two metal sheets, at least one capable of superplastic deformation and diffusion bonding, which are positioned face to face, to a bonding and deforming process during which the sheets are joined to one another at a series of spaced joint lines across their faces, the joint lines being interrupted by non-joined regions along their lengths but being otherwise substantially continuous, and during which parts of at least said one sheet between the joint lines and the non-joined regions thereof are superplastically deformed in a mould to form a series of cavities between the two sheets, portions of at least said one sheet on respective sides of each of the joint lines and the non-joined regions thereof being moved to form sidewalls of two neighboring cavities, these sidewalls being urged to lie adjacent one another over substantial parts of their areas, so that they become diffusion bonded, one to another, to form a common sidewall of neighboring cavities, the non-joined regions of the joint lines each forming a generally circular or part-circular aperture in each sidewall of a diameter similar to the length of the non-joined region.

4 Claims, 6 Drawing Figures

MOULD OUTLINE

STIFFENED PANEL WITH APERTURES

This invention relates to stiffened panels of the type formed by a method including subjecting two metal sheets, at least one capable of superplastic deformation and diffusion bonding, which are positioned face to face, to a bending and deforming process during which the sheets are joined (for example by a welding or other joining process) to one another at a series of spaced substantially continuous joint lines across their faces, and during which parts of at least said one sheet between the joint lines are superplastically deformed in a mould to form a series of cavities between the two sheets, portions of at least said one sheet on respective sides of a joint line being moved to form sidewalls of two neighbouring cavities, these sidewalls being urged to lie adjacent one another over substantial parts of their areas, so that they become diffusion bonded one to another to form a common sidewall of neighbouring cavities.

Such a method, and stiffened panels formed thereby, is disclosed in British Pat. No. 2,030,480 and U.S. Pat. No. 4,351,470.

Whilst this method provides a relatively efficient structure for the panel, it is found that a feature inherent in superplastic forming known as "thinning" occurs. It is manifest by a reduction in the thickness of the formed material as the amount of forming increases; in some cases at least this thinning is disadvantageous since material may not be present where it is most needed and vice versa.

Accordingly, it is an object of the present invention to effect redistribution of material during forming according to the method above defined and thus to improve structural efficiency.

According to one aspect of the invention, a method of making a stiffened panel includes subjecting two metal sheets, at least one capable of superplastic deformation and diffusion bonding, which are positioned face to face, to a bonding and deforming process during which the sheets are joined to one another at a series of spaced joint lines across their faces, the joint lines being interrupted by non-joined regions along their lengths, but being otherwise substantially continuous, and during which parts of at least said one sheet between the joint lines and the non-joined regions thereof are superplastically deformed in a mould to form a series of cavities between the two sheets, portions of at least said one sheet on respective sides of each of the joint lines and the non-joined regions thereof being moved to form sidewalls of two neighbouring cavities, these sidewalls being urged to lie adjacent one another over substantial parts of their areas, so that they become diffusion bonded one to another to form a common sidewall of neighbouring cavities, the non-joined regions of the joint lines each forming a generally circular or part-circular aperture in each sidewall of a diameter similar to the length of the non-joined region.

Figure 1B:
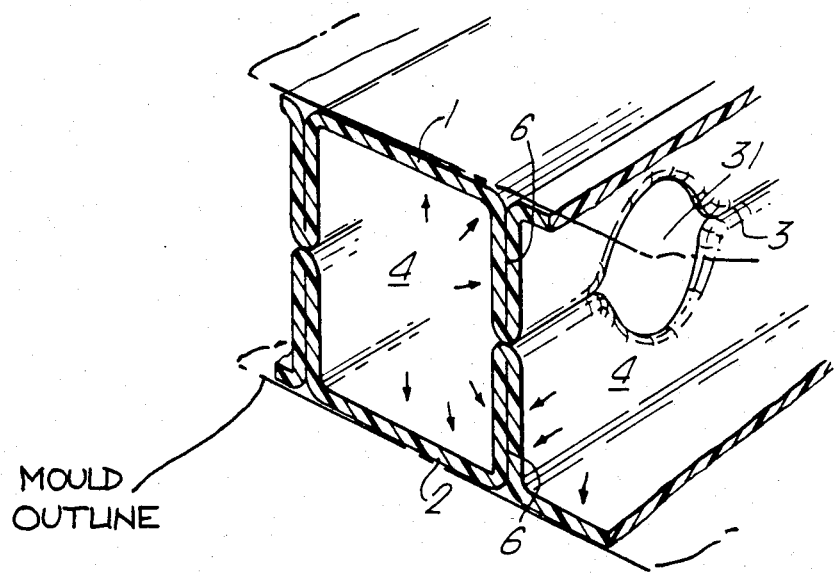
Figure 2A:
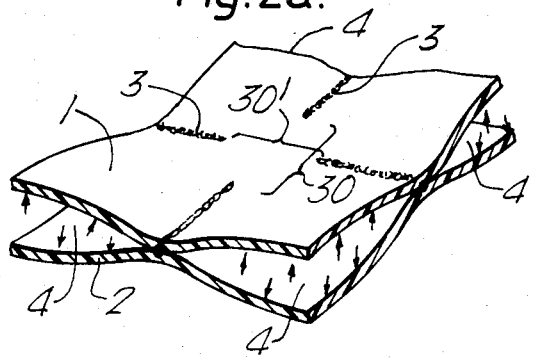
Figure 2B:
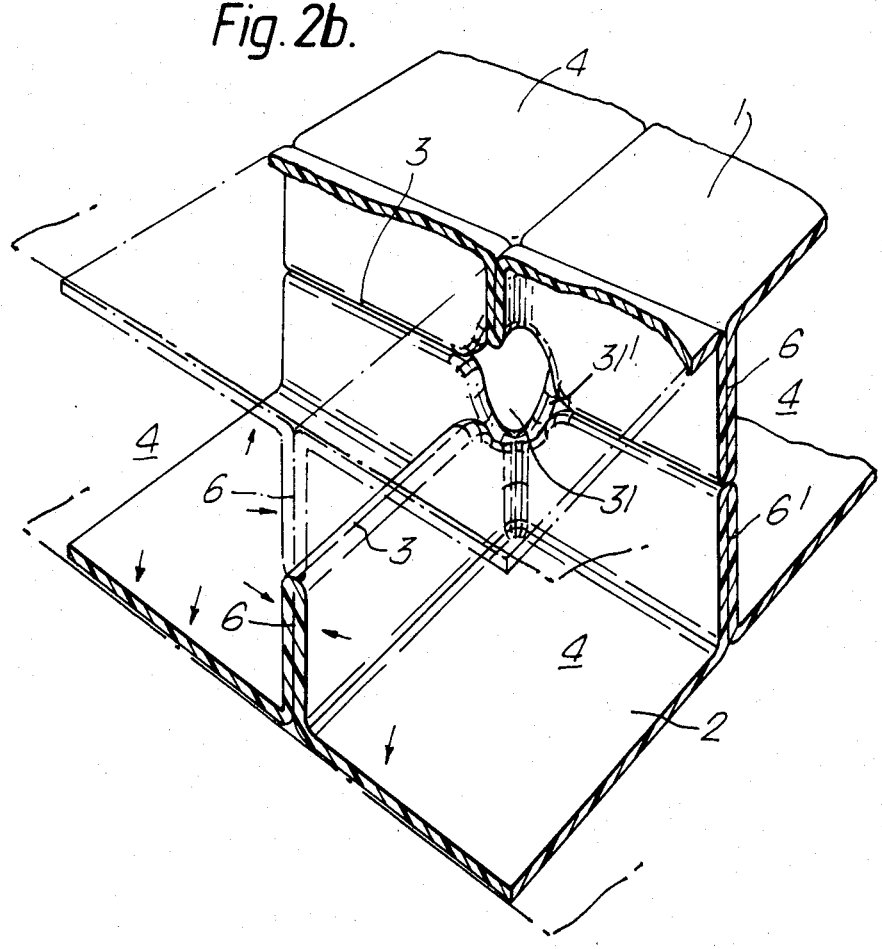
Figure 3A:
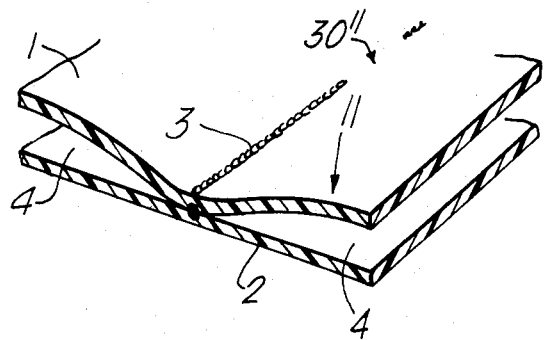
Figure 3B:
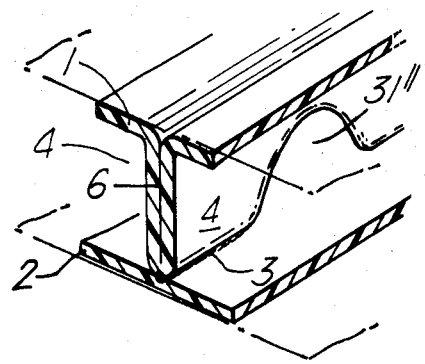

By this arrangement, the material of each sidewall can be redistributed during the forming process Some embodiments of the invention are described by way of example with reference to the accompanying drawings in which:

FIGS. 1a and 1b are perspective views of a portion of a partly formed, and a fully formed panel, respectively, FIGS. 2a and 2b are similar views of an alternative embodiment, and FIGS. 3a and 3b are similar views of yet a further embodiment.

Referring to FIGS. 1a and 1b, a stiffened panel is formed from sheets 1 and 2. Both sheets have superplastic characteristics and are capable of being diffusion bonded. They are attached to one another by forming continuous or near continuous welds around the edges of the sheets and along several other lines 3 forming enclosed neighbouring inflatable envelopes 4, the two sheets being clamped between the upper and lower members (not shown) respectively of a forming mould into which superplastic deformation is to take place. The welding is preferably but not necessarily electron beam welding.

The forming mould and the two sheets 1 and 2, are heated to within a temperature range at which the sheets 1 and 2 exhibit superplastic characteristics. An inert gas is admitted under pressure into the envelopes 4 via inlet tubes (not shown). This gradually causes the envelopes 4 to expand in balloon-like fashion, the envelopes thus becoming cavities. Expansion in this form continues until respective metal sheets contact the upper and lower members of the forming mould when the expanding metal, in the region of contact, takes on the flattened shape of the upper and lower mould members, the overall shape of each cavity becoming sausage-like in transverse cross-section. As pressurised gas is continued to be admitted, the flattened surfaces of the sausage-shape grow to form a generally rectangular shape when neighbouring regions of the cavities forming the walls meet and diffusion bonding occurs, the regions of diffusion bonding being referenced 6. These regions form sidewalls of neighbouring cavities 4. Any one side wall of a cavity extends, as illustrated, between an upper surface member and a lower surface member of the formed panel with the jointline 3 lying intermediate the two surfaces.

To effect aperturing and consequent redistribution of material in the sidewalls, where the sheets are joined by the welded joint lines 3, all or some joint lines 3 are interrupted by non-joined regions 30 (FIG. 1a) of a length chosen such that as the envelopes 4 expand to form their cavities, a generally circular aperture 31 (FIG. 1b) is formed in those neighbouring regions of the cavities which meet and are diffusion bonded at 6 to form walls. The diameter of an aperture 31 is similar to the length of the non-joined region forming that aperture. Naturally, the diameter of an aperture is chosen to be commensurate with the final formed depth of each sidewall. It can be, for example, between ¼ and ¾ the fully formed depth of the sidewall.

Where the joint lines 3 cross over one another as shown in FIGS. 2a and 2b the regions of cross-over are interrupted by non-joined regions 30 and 30' so that when the envelopes 4 expand to form their cavities, as previously described, to form diffusion bonded walls 6 and 6' apertures 31 and 31' are formed at the cross-over point, that is to say the intersection, in both walls.

The described arrangements do not reduce weight in the manner of conventional lightening holes because no material is removed. Nevertheless, because of that inherent feature of superplastic forming known as 'thinning' which is manifest by a reduction in the thickness of the formed material as the amount of forming increases, the apertures so formed enable material to be advantageously redistributed during the forming to compensate. Thus thinner sheets can be used for the initial condition thereby to increase structural efficiency.

In the embodiment of FIGS. 2a and 2b where two walls intersect, that is to say cross one another, the effect of 'thinning' is usually severe due to the large forming movements necessary, it is found that the described technique is used to particular advantage.

In the embodiment of FIGS. 3a and 3b, a stiffened panel is formed from sheets 1 and 2, but only that referenced 1 is arranged to be superplastically formed and diffusion bonded. Thus when pressurised gas is admitted to an envelope 4 only that side bounded by the sheet 1 expands to form a cavity and finally takes on the flattened shape of an upper mould member. As the pressurised gas is continued to be admitted, only neighbouring regions of the sheet 1 meet for diffusion bonding at 6, so that any one side wall extends between an upper and a lower surface member as previously but the jointline 3 lies on the bottom surface, that is to say the unformed sheet 2.

In this case, those non-joined regions 30" are of a length chosen so that a generally semi-circular aperture 31" is formed in the diffusion bonded regions 6.

We claim:

1. A method of making a stiffened panel including subjecting two metal sheets, at least one capable of superplastic deformation and diffusion bonding, which are positioned face to face, to a bonding and deforming process during which the sheets are joined to one another at a series of spaced joint lines across their faces, the joint lines being interrupted by non-joined regions of substantial length along their lengths but being otherwise substantially continuous, and during which parts of at least said one sheet between the joint lines and the non-joined regions thereof are superplastically deformed in a mould to form a series of cavities between the two sheets, portions of at least said one sheet on respective sides of each of the joint lines and the non-joined regions thereof being moved to form sidewalls of two neighbouring cavities, these sidewalls being urged to lie adjacent one another over substantial parts of their areas so that they become diffusion bonded, one to another, to form a common sidewall of neighbouring cavities, the non-joined regions of the joint lines each forming a generally circular or part-circular aperture in each sidewall of a diameter similar to the length of the non-joined region and such diameter being a relatively large proportion of the depth of the sidewall, the material of each sidewall being redistributed by reason of the apertures.

2. A method of making a stiffened panel according to claim 1, in which the joint lines intersect one another and non-joined regions are provided at the intersections.

3. A stiffened panel formed by the method of claim 2.

4. A stiffened panel formed by the method of claim 1.

* * * * *